United States Patent [19]
Kawabe et al.

[11] Patent Number: 5,245,493
[45] Date of Patent: Sep. 14, 1993

[54] MAGNETIC INFORMATION STORAGE APPARATUS INCLUDING MAGNETIC HEAD AND METHOD FOR MAKING MAGNETIC HEAD

[75] Inventors: Takashi Kawabe; Moriaki Fuyama, both of Hitachi; Shinji Narishige, Mito; Eizi Ashida, Hitachioota; Makoto Morijiri, Ninomiya; Masanori Tanabe; Hiroshi Fukui, both of Hitachi; Yutaka Sugita, Tokorozawa; Hiroshi Ikeda, Tokyo; Masaaki Hayashi; Kazuo Nakagoshi, both of Odawara; Kanji Kawakami, Mito; Yokuo Saitoh, Kaisei; Shunichiro Kuwatsuka, Odawara, all of Japan

[73] Assignee: Hitachi, Ltd., Tokyo, Japan
[21] Appl. No.: 495,908
[22] Filed: Mar. 20, 1990

[30] Foreign Application Priority Data

Mar. 20, 1989 [JP] Japan .................................. 1-66230

[51] Int. Cl.⁵ .............................................. G11B 5/147
[52] U.S. Cl. ...................................... 360/126; 360/122
[58] Field of Search ............... 360/125, 126, 121, 127, 360/110, 122–123, 119

[56] References Cited

U.S. PATENT DOCUMENTS

| | | | |
|---|---|---|---|
| 4,589,042 | 5/1986 | Anderson et al. | 360/125 |
| 4,839,197 | 6/1989 | Henderson | 360/119 |
| 4,841,402 | 6/1989 | Imanaka et al. | 360/126 |
| 4,853,815 | 8/1989 | Diepens | 360/126 |
| 4,890,378 | 1/1990 | Suzuki et al. | 360/119 |
| 4,916,563 | 4/1990 | Kawase | 360/119 |
| 4,951,166 | 8/1990 | Schewe | 360/126 |
| 4,962,437 | 10/1990 | Wilcox | 360/122 |
| 5,025,342 | 6/1991 | Nagata et al. | 360/126 |
| 5,060,098 | 10/1991 | Gotoh et al. | 360/122 |
| 5,142,425 | 8/1992 | Gailbreath, Jr. et al. | 360/123 |

FOREIGN PATENT DOCUMENTS

| | | |
|---|---|---|
| 0131716 | 1/1985 | European Pat. Off. |
| 60-10409 | 1/1985 | Japan . |
| 62-62415 | 3/1987 | Japan . |
| 63-168811 | 7/1988 | Japan . |
| 2247809 | 10/1990 | Japan .................................. 360/104 |

OTHER PUBLICATIONS

Journal of Applied Physics, vol. 61, Apr. 15, 1987, Part II B, pp. 4157, 4162.

*Primary Examiner*—John H. Wolff
*Attorney, Agent, or Firm*—Antonelli, Terry, Stout & Kraus

[57] ABSTRACT

A magnetic head for reading from and/or writing to a magnetic information storage medium has a substrate on which a plurality of thin films are formed in sequence. The films provide a magnetic circuit having a magnetic gap, a bottom pole piece and a top pole piece overlying said bottom pole piece. The top pole piece is formed as a tip portion adjoining the magnetic gap and a rear portion which makes magnetic contact with the tip portion. The rear portion is formed in the sequence after the tip portion. To ensure accurate thickness and width of the tip portion, a non-magnetic protective film is formed on the tip portion after the tip portion is formed and before the rear portion is formed.

22 Claims, 11 Drawing Sheets

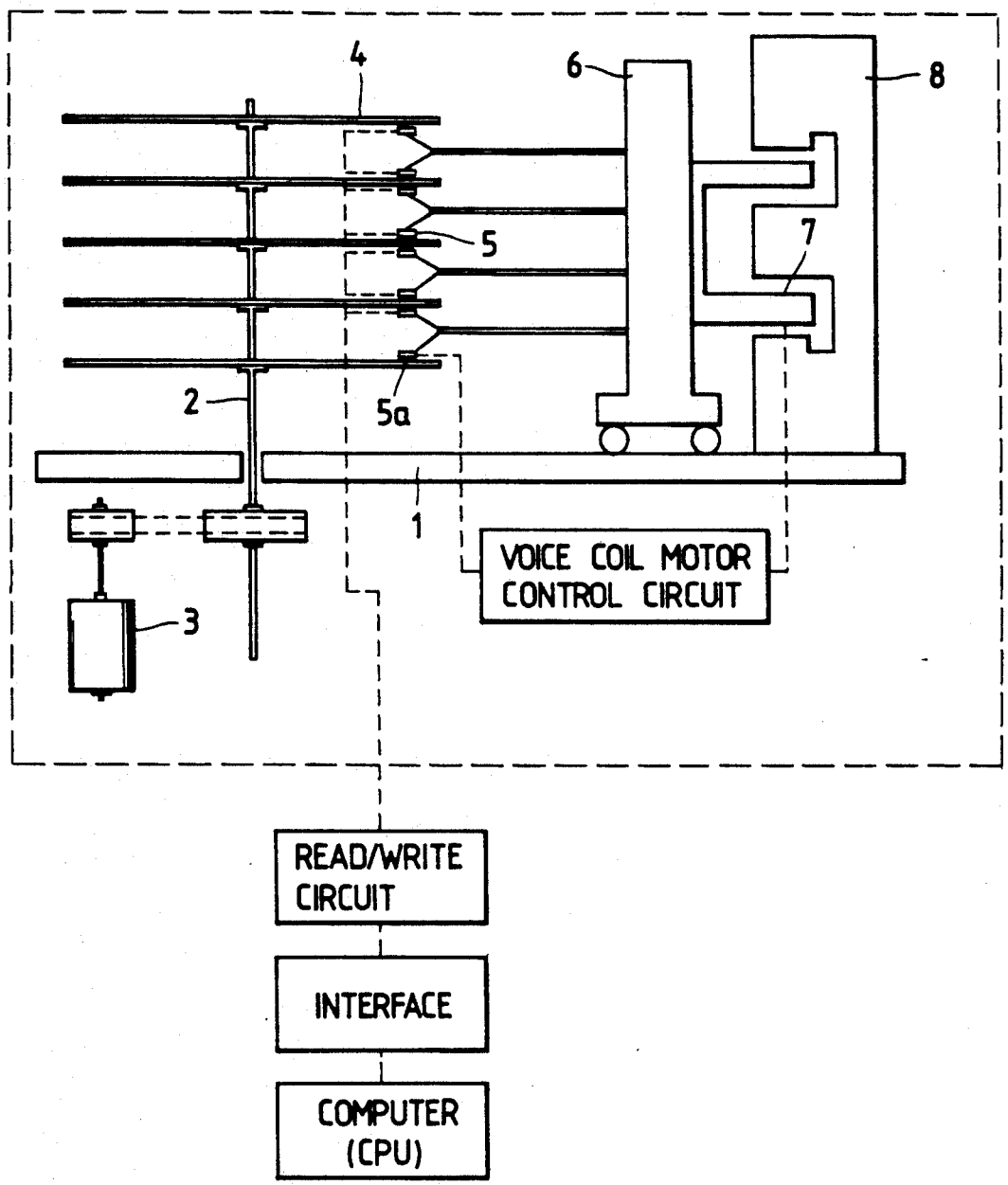

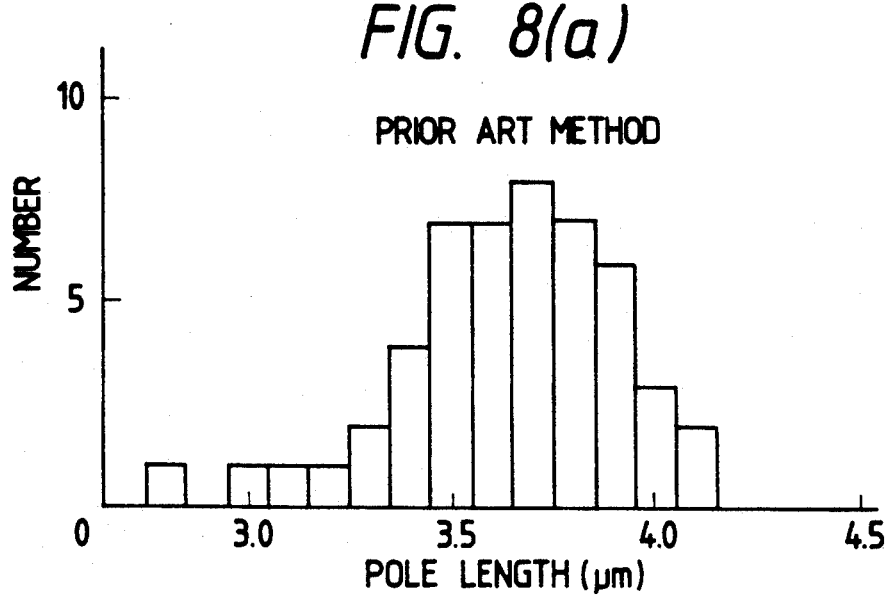
FIG. 8(a) PRIOR ART METHOD
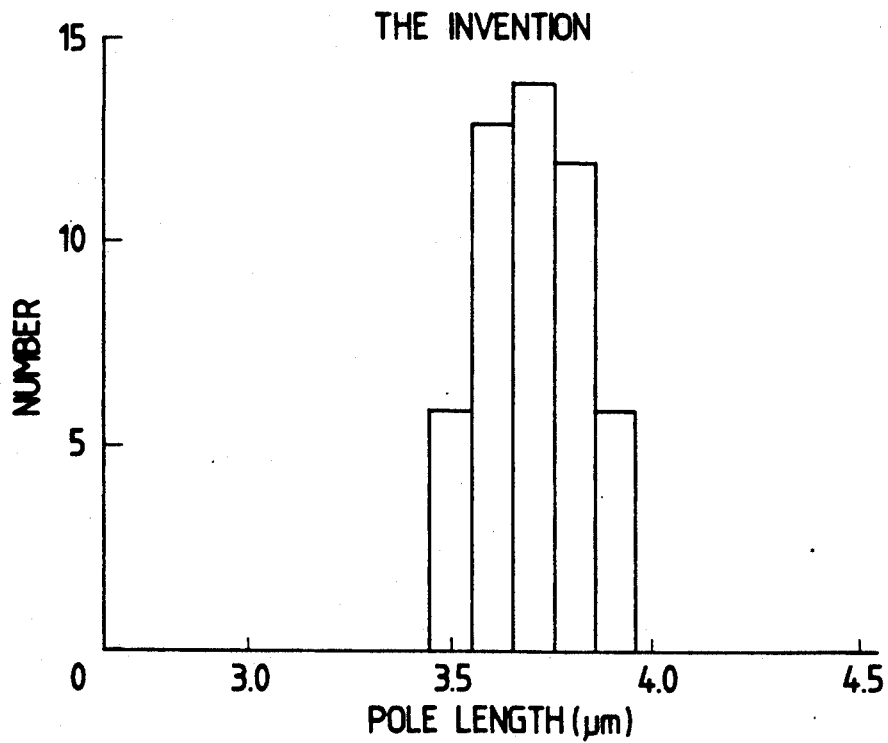
FIG. 8(b) THE INVENTION

MAGNETIC INFORMATION STORAGE APPARATUS INCLUDING MAGNETIC HEAD AND METHOD FOR MAKING MAGNETIC HEAD

BACKGROUND OF THE INVENTION

1. Field of the Invention

This invention relates to magnetic heads for writing to and/or reading from magnetic information storage media, particularly such heads formed by thin film techniques. The invention is particularly though not exclusively applicable to such heads for use in magnetic hard disc storage devices. The invention also relates to a method of making such a head.

2. Description of the Prior Art

The storage capacity required of magnetic hard disc storage devices has become greater and greater, with the increase in the processing capacity of computers. Consequently, since it is desired not to increase the size of such hard disc devices, it is sought to reduce the track width of the disc, which means also reducing the track width of the magnetic pole pieces of magnetic heads used for writing to and reading from such discs. It is also necessary to control the pole thickness (pole length) of these magnetic heads. When manufacturing such magnetic heads, it is important to achieve high accuracy in both the track width of the head and the pole thickness, in order to avoid an unacceptably high number of low quality or defective products.

Among many factors relevant to the bit length on the disc, pole thickness of the magnetic head is significant.

Thin film techniques have been applied to the production of magnetic heads having very small track width and pole thickness. These techniques involve forming a number of layers on a substrate. The substrate in this case is typically a ceramic slider of the magnetic head.

The structure of a prior art thin film magnetic head will be explained with reference to FIGS. 2(a) and 2(b) which are perspective and sectional views showing the structure of the principal portions of the head.

A bottom magnetic film 22 is formed on a substrate 21 and constitutes a bottom magnetic pole piece forming a magnetic circuit in cooperation with an top magnetic pole piece film 23 which is to be formed later. A non-magnetic material 25 is sandwiched between the top and bottom magnetic films 23 and 22 at a tip portion 24, forming a magnetic gap. Write and read operations are conducted by the top and bottom magnetic films 23, 22 and the magnetic gap.

At the central portion of the magnetic head, a conductor coil 26 is disposed between the pole pieces so as to encircle and cross the magnetic circuit. This conductor coil 26 is insulated from the top and bottom magnetic films 23, 22 by insulator films 27. The upper part of the device is covered with a thick protection film 28.

The recording density of the magnetic disc apparatus using this thin film magnetic head is determined primarily by the shape of the tip portion 24. Particularly, the width d of the top magnetic film 23 which determines the track width and a pole thickness t (the sum of the thickness of the bottom magnetic film 22, the magnetic gap and top magnetic film 23) which determines over-write and resolution must be formed very accurately. To form the value d highly accurately, the pattern of the top magnetic film 23 must be formed highly accurately at the lower part of the step down from the insulator films 27 which has a height of about 10 μm. However, when a photosensitive resin is coated on such a high step, the photosensitive resin at the region next to the step is as thick as about at least 10 μm so that a highly accurate pattern of the film 23 cannot be formed.

Accordingly, it has been proposed to form the tip portion of the top pole piece separately from a rear portion thereof.

In Japanese Laid-Open Patent Application No. JP-A-60-10409 for example, only the tip portion of the top magnetic film is formed before the insulator film is formed and thereafter the insulator film and the rear portion of the top magnetic film are formed. According to this method, the width of the top magnetic film can be determined when the step hardly exists, and this document describes that the track width can be made highly accurately.

Japanese Laid-Open Patent Applications Nos. JP-A-62-62415 and JP-A-63-168811 disclose methods in which the tip portion of the top magnetic film is formed after the lowermost layer of the insulator is formed, and then the upper layer of the insulator and the rear portion of the top magnetic film are formed. By these methods also, the width of the top magnetic film can be determined when the step is low, and the documents describe that the track width can be made highly accurately.

A method in which each of the top and bottom magnetic films is formed by dividing it into a tip portion and a rear portion is disclosed in Japanese Laid-Open Patent Application No. JP-A-60-10410. According to this method, it is possible to form the tip portion of the magnetic film of a high saturation magnetization alloy and the rear portion of a high permeability magnetic material. The document states that a thin film magnetic head having excellent recording characteristics can be obtained.

While the first three of these prior art documents describe formation of the tip portion of the top pole piece, they have failed to consider the effect of subsequent processing on the tip portion. The etching of the layer for the rear portion of the top pole piece will affect the tip portion as well, both in width and thickness. This problem and its effect on the important factor of pole thickness has not been considered.

The influence exerted by the fluctuation of the pole thickness or length on the characteristics of the thin film magnetic head will be explained with reference to FIG. 6. FIG. 6 shows the relation between the over-write value and the resolution value representing the write capacity and read capacity of the thin film magnetic head, respectively, and the pole length. This diagram is disclosed in M. Hanazono et al., "Design and Fabrication of Thin-Film Heads Based on a Dry Process", *Journal of Applied Physics*, Vol. 61, No. 8, Part IIB, Apr. 15, 1987, pp. 4157–4162.

As shown in FIG. 6, when the pole length increases, over-write increases but resolution drops. In a thin film magnetic head, both over-write and resolution are preferably large so that the pole length must be controlled strictly to a value within a certain range. More definitely, it has been found that unless the thin film magnetic head is produced while controlling the pole length within about ±10% of a target value, good characteristics cannot be produced stably.

However, when any of the prior art techniques described above are applied, the pole thickness or length fluctuates because after the tip, portion of the top magnetic film is formed, the insulator layer, the conductor coil and the rear portion of the top magnetic film are laminated. During this, the surface of the tip portion of the top magnetic film that has been formed previously is etched or damaged.

Generally, the conductor coil is formed by ion milling or electro-plating, for example, and the surface of the tip portion of the top magnetic film is unavoidably etched by over-etching at the time of ion milling or during the etching step of a plating base film. Similarly, the surface of the tip portion of the top magnetic film is unavoidably etched during the formation step of the rear portion of the top magnetic film and hence the fluctuation of the pole length is unavoidable. It might be possible to form, in advance, the tip portion of the top magnetic film with greater thickness, so as to compensate for the decrease of the pole length by this etching and to attain a target pole length after etching. In such a case, too, variance of etching at the time of formation of the conductor coil and the rear portion of the top magnetic film adds to variance of the film thicknesses of the bottom magnetic film, magnetic gap film and tip portion of the top magnetic film. For this reason, the fluctuation of the pole length is so great that it cannot be controlled within the range of ±10% described above.

In JP-A-60-10410 cited above, there is disclosed a method which divides the top magnetic film into two parts and forms the tip portion after the rear portion is formed. If this method is employed, the surface of the tip portion of the top magnetic film is not etched during the production process, but the pattern of the tip portion which determines the track width must be formed at the lower part of the step having a height of about 10 μm. Thus, there is left the problem that the track width cannot be made highly accurate.

When the relation between the structure of a practical thin film magnetic head and its recording characteristics is taken into consideration, the relation of position of the connection between the tip portion and the rear portion of the top magnetic film is extremely important, and exerts a significant influence on the recording characteristics of the head. However, none of the prior art disclosures described above consider the shapes and positions of the tip portion and rear portion of the top magnetic film.

SUMMARY OF THE INVENTION

It is an object of the present invention to provide a thin film magnetic head which at least partly overcomes the problems of the prior art described above and can form the pole length and the track width highly accurately.

It is another object of the present invention to provide a thin film magnetic head having excellent write and read characteristics by improving the shape and structure.

The invention in one aspect provides a magnetic head for at least one of reading from and writing to a magnetic information storage medium, having a substrate on which a plurality of thin films are formed in sequence. The films provide a magnetic circuit having a magnetic gap, a bottom pole piece and a top pole piece overlying said bottom pole piece. The top pole piece is formed from at least two of said films comprising a first film providing a tip portion of the top pole piece adjoining said magnetic gap and a second film providing a rear portion of the top pole piece which makes magnetic contact with the tip portion, the second film being formed in said sequence after said first film. The films further including a non-magnetic protective film on said tip portion formed in said sequence after said first film and before said second film. The protective film protects the tip portion after its formation, e.g. during subsequent etching of the film providing the rear portion of the top pole piece.

In one form of the invention, the non-magnetic protective film on the upper face of said tip portion has an end surface which defines at least one edge region of the magnetic contact area of the tip portion and the rear portion, this edge region being on the side towards the track-defining end surface of the top pole piece. The end surface of said non-magnetic protective film may be at an etched edge thereof. The end surface of the protective film may be at least part of a surface surrounding a hole in said protective film, the magnetic contact area being located in said hole.

Preferably the rear portion of the top pole piece overlies part of the protective film.

The protective film is preferably of inorganic material, and may have a thickness in the range of 0.5 to 2 μm.

The surface area of the magnetic contact area of the tip portion and the rear portion is preferably greater than the smallest cross-sectional area of the tip portion between the magnetic contact area and the track-defining end surface of the top pole piece.

The tip portion, as seen in plan view on the substrate, is preferably wider in the direction parallel to the track-defining end surfaces of said pole pieces at the magnetic contact area than at said end surface of said top pole piece.

In another aspect of the invention, as seen in plan view on the substrate, at the region of the magnetic contact area of the tip and rear portions of the top pole piece, the rear portion is wider than said tip portion in the direction parallel to the track-defining surfaces of the pole pieces.

In yet another aspect of the invention, the magnetic head has a magneto-resistive element and the tip portion extends from the magnetic contact area with the rear portion so as to make magnetic contact with the magneto-resistive element.

In its method aspect, the invention provides a method of making a magnetic head for at least one of reading and writing to a magnetic information storage medium, comprising the steps of:

(i) applying to a substrate at least one bottom pole piece thin film, (ii) after step (i), forming on said substrate a first top pole piece thin film having a tip portion which in the completed magnetic head provides an end surface adjoining a magnetic gap, said first top pole piece film overlying at least partly said bottom pole piece film, (iii) after step (ii), forming on said substrate a protective film which exposes an area of said tip portion of said first top pole piece film, which area is a magnetic contact area for said tip portion, (iv) after step (iii), applying a second top pole piece thin film so as to make magnetic contact with said tip portion at said magnetic contact area, (v) removing said second top pole piece film at a region between said magnetic contact area and the location of said tip portion end surface in the finished magnetic head, while said protective film is retained in position above said tip portion. Subsequently, the protective film may be completely removed.

The invention also provides a head disc assembly for a magnetic information storage apparatus, including a magnetic head as described above.

The invention further provides magnetic information storage apparatus including a magnetic head as described above.

BRIEF DESCRIPTION OF THE DRAWINGS

Embodiments of the invention will now be described by way of non-limitative example with reference to the accompanying drawings, in which:

FIG. 1 is a schematic view showing the structure of a magnetic disc apparatus as part of an information processing system;

FIGS. 8(a) and 8(b) show histograms illustrating results obtained with the prior art and the present invention, respectively;

DESCRIPTION OF THE PREFERRED EMBODIMENTS

Figure 2A:
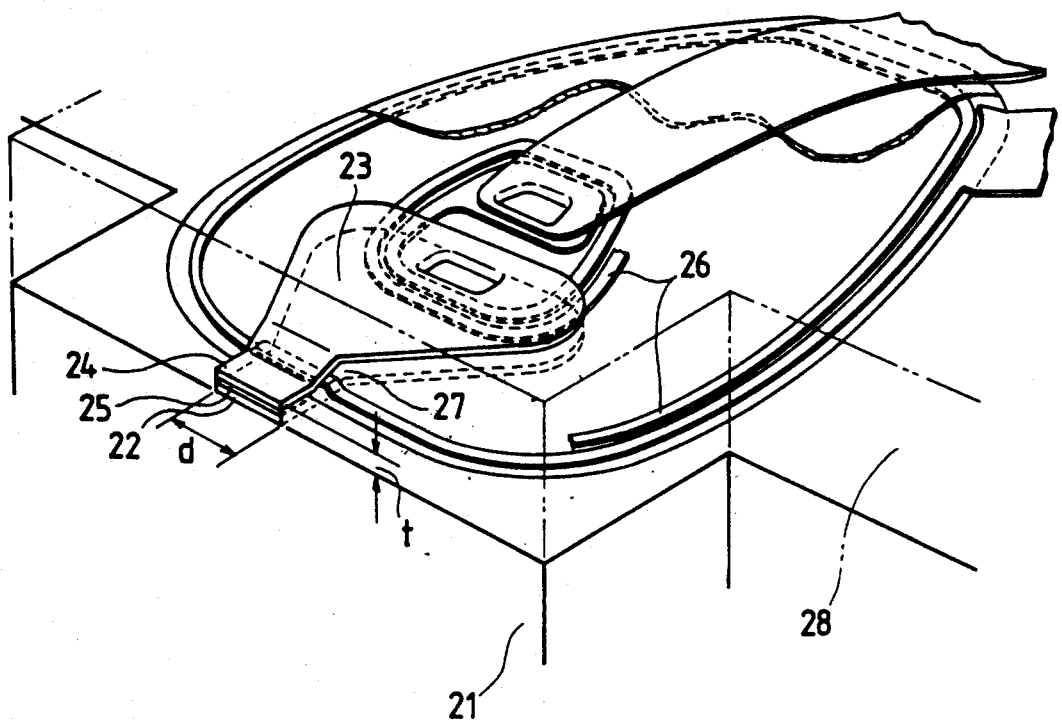
FIGS. 2(a) and 2(b) are a perspective view and a sectional view of a prior art thin film magnetic head discussed above.

FIG. 1 is a schematic view showing the structure of a magnetic disc information storage apparatus to which the present invention may be applied. The apparatus includes a head disc assembly. A plurality of magnetic discs 4 (so-called "hard discs") are fitted to one spindle 2 mounted in a base 1. Though five magnetic discs are shown fitted to one spindle, this number is not particularly limited to five. A plurality of spindles each equipped with a plurality of magnetic discs as described above may be provided.

A motor 3 drives the spindle 2 and rotates the magnetic discs. There are magnetic heads 5 for data and a magnetic head 5a for positioning, and a carriage 6, a voice coil 7 and a magnet 8. The voice coil 7 and the magnet 8 together form a voice coil motor and the elements 6, 7 and 8 effect positioning of the heads. The voice coil 7 and the magnetic head 5a are connected together through a voice coil motor control circuit.

The magnetic disc 4 consists of a non-magnetic disc such as aluminium equipped with a magnetic material layer disposed on one or both of its surfaces. A large number of recording tracks are disposed on the magnetic material layer 4. To give some idea of desired parameters of such apparatus, the areal recording density of the disc 4 may be as high as 54 megabits per square inch or more. The track density may be as high as 1,800 tracks/inch or more. The linear recording density is desirably 30K bits per inch. If these requirements can be achieved, the recording density can be increased without increasing remarkably the disc diameter.

The utilization of the disc will be low if the data transfer rate drops much even when the recording density increases and the storage capacity of information becomes great. The data can be taken in and out rapidly if the data transfer rate is at least 4 megabytes/second. This data transfer rate is determined by the product of the peripheral speed of the disc and the linear recording density. Since the linear recording density is desirably at least 30K bits/inch, the data transfer rate of at least 4 megabytes/sec can be accomplished by setting the speed of the disc to at least 3,500 rpm in the case of a disc having a diameter ranging from 8 to 11 inches. The speed of 3,500 rpm is typically employed in magnetic disc apparatuses in general and can be accomplished easily.

In FIG. 1, there is indicated a computer system or CPU, for example, which has the function of processing the information recorded on the magnetic disc apparatus. A read/write circuit discriminates the information for writing and for reading and sends a signal to the magnetic disc apparatus. An interface connects the computer to the magnetic disc apparatus. The system which includes this computer and the magnetic disc apparatus is an information processing system.

Figure 3:
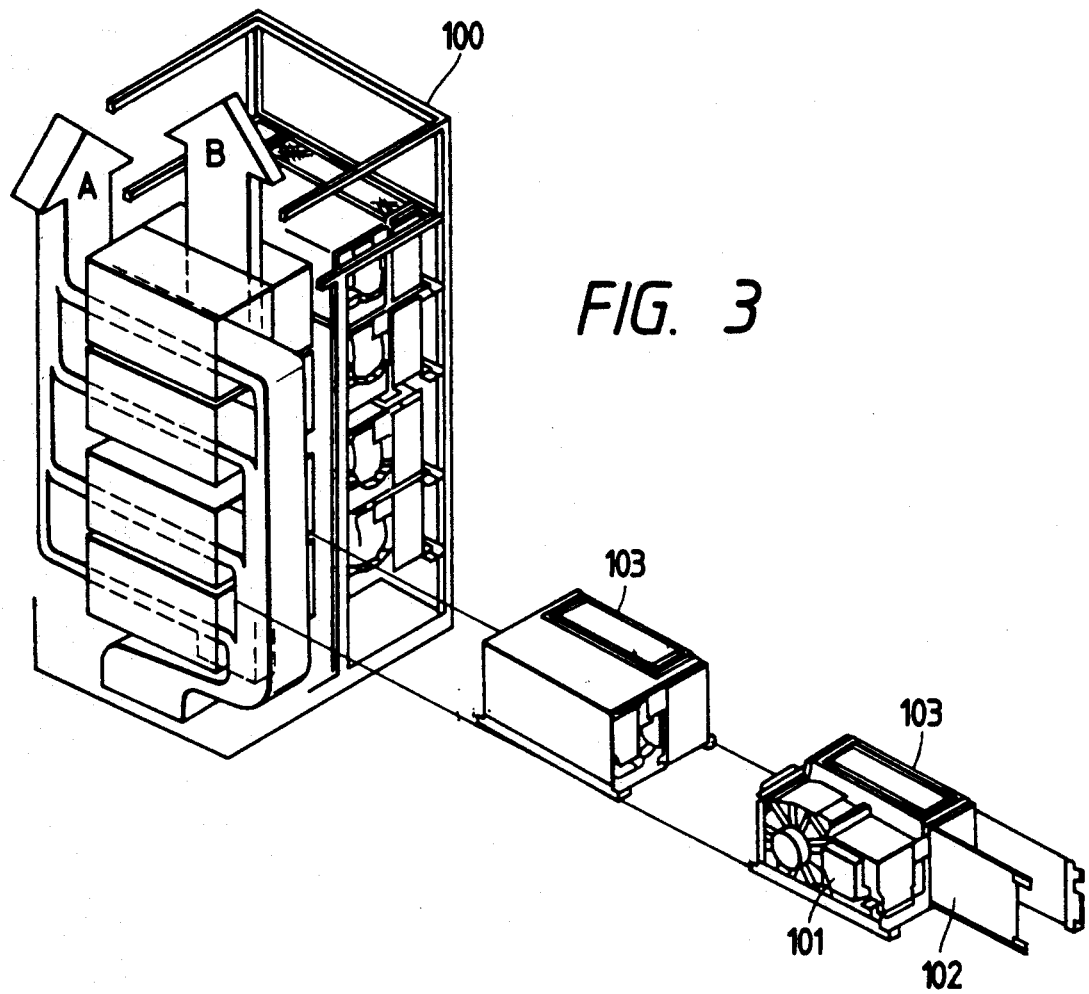
FIG. 3 is a perspective view of a magnetic disc apparatus to which the magnetic head in accordance with the present invention is applied.

FIG. 3 is a perspective view showing how the magnetic disc apparatus of FIG. 1 may be stored in a predetermined space.

A head/disc assembly (HDA) 101 and an electronic circuit portion 102 form a head/disc assembly unit (HDU) 103 inside a container 100. Eight HDUs 103 are provided and two each are stored in four levels. The container 100 is from 0.5 to 1.5 m long on each side of the bottom and about 2 m high. In FIG. 3, symbols A and B represent the flows of air for supplying clean air to the HDAs and to the circuit portions in each HDU respectively.

The present invention can provide various advantages in such magnetic disc apparatus. In the magnetic head, the material for the tip portion of the top magnetic pole piece can be different from that for its rear portion and for this reason, the write magnetic field to the magnetic disc can be increased. Accordingly, the thin film magnetic head can be made compact if the write operation can be made sufficiently with the same magnetic field as in the conventional magnetic disc apparatus. Since the number of turns of the conductor coil may be reduced, inductance of the thin film magnetic head can be reduced so that the magnetic disc apparatus can be used at a high frequency. In other words, the data transfer rate can be increased and when a 9.5-inch diameter magnetic disc is rotated at 4,500–5,500 rpm, a data transfer rate of 4.5–6.5 megabytes/sec becomes feasible.

If the write magnetic field is increased, a magnetic disc having high coercive force can be used so that recording can be made at a large linear density.

Furthermore, since high density recording can be obtained, large capacity can be achieved and a magnetic disc apparatus having a capacity of 60 gigabytes or more becomes feasible.

If the storage capacity is the same as that of the existing magnetic disc apparatus, the magnetic disc apparatus can be made compact and the magnetic disc, too, can be made small. Therefore, the access time can be shorter, high speed search becomes possible and a magnetic disc apparatus with less power consumption can be provided.

Figure 4:
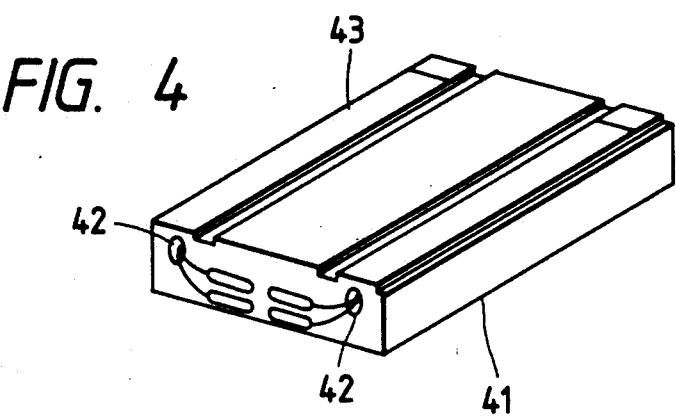
FIG. 4 is a perspective view showing how the thin film magnetic head of the present invention may be formed on a slider.

FIG. 4 is a perspective view showing the thin film magnetic head of the present invention formed on a slider 41 which is made of a non-magnetic ceramic, for example. The thin film magnetic head 42, which has typically the general shape shown in FIG. 2(a), is formed integrally on one end face of the slider, with the track-forming surface of the head at the face 43 of the slider. Two heads 42 are provided on one slider. The face 43 is a float surface, which faces the magnetic disc.

Figure 5:
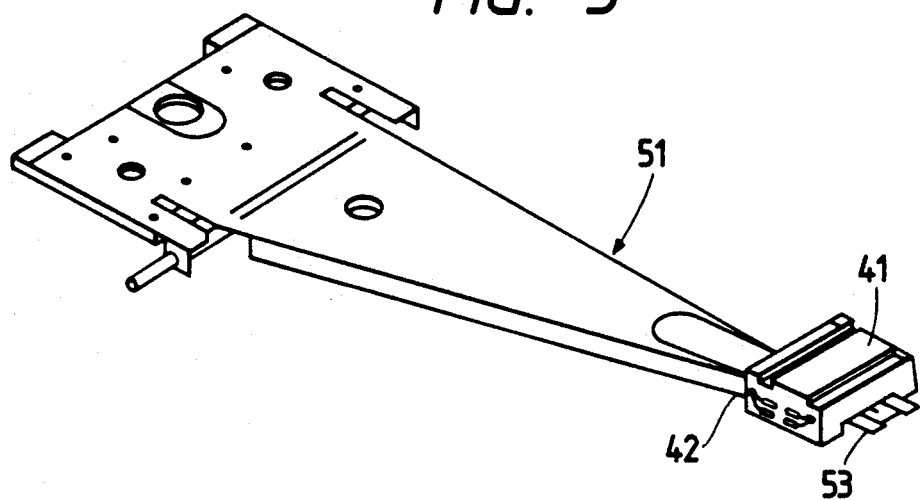
FIG. 5 is a perspective view showing the slider formed on a load arm.
Figure 6:
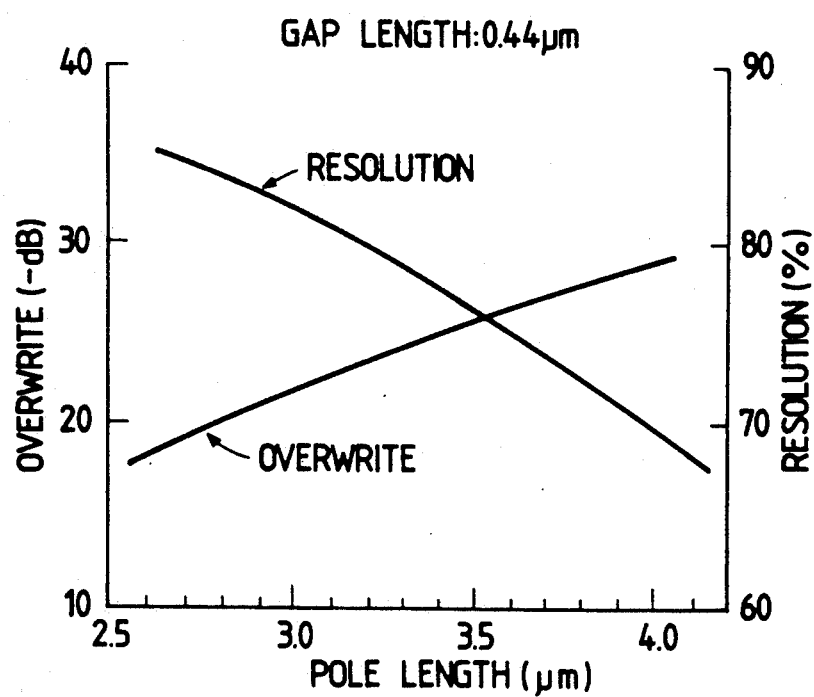
FIG. 6 is a diagram showing certain effects in magnetic heads.

FIG. 5 shows the slider of FIG. 4 on a load arm 51. A gimbals spring 51 keeps the distance from the magnetic disc constant. The distance of the magnetic disc from the thin film magnetic head 42 formed at the tip of the slider 41 where the magnetic disc rotates is generally called the "spacing" and is one of the important factors of the performance of the magnetic disc apparatus. With the thin film magnetic head of the present invention this spacing can be kept below 0.3 μm.

Figure 7A:
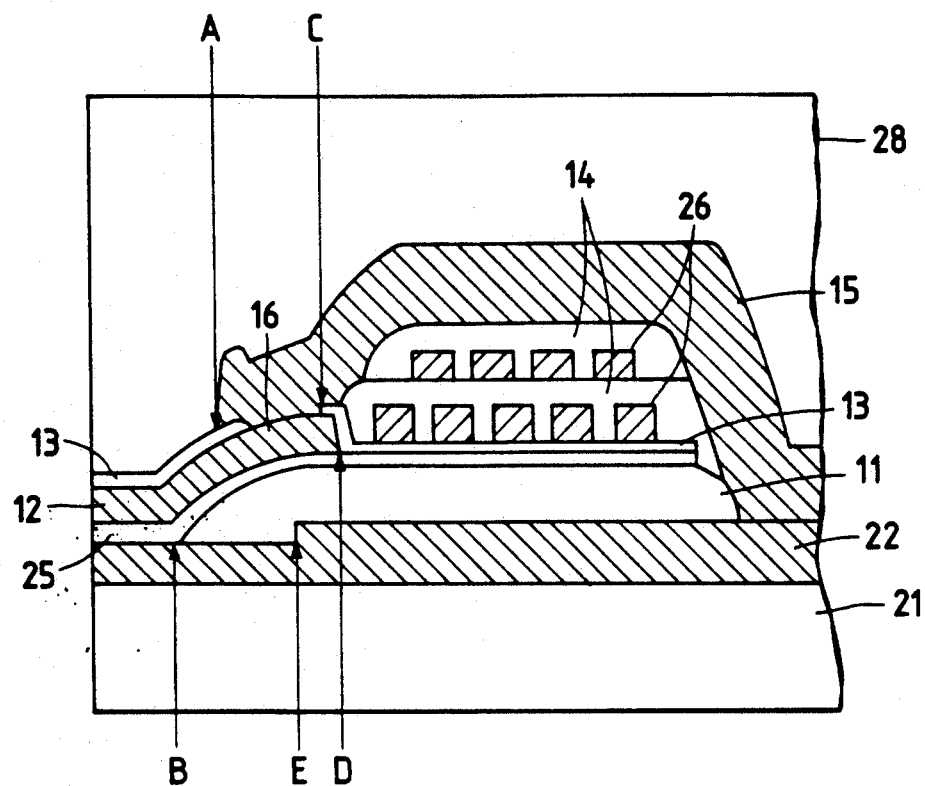
FIGS. 7(a) and 7(b), 9(a) and 9(b), 10, 11, 12 and 13 are sectional views and top views of the thin film magnetic heads embodying the present invention.

FIG. 7(a) is a sectional view of the principal portions of a thin film magnetic head of the present invention. On the substrate 21, there are a plurality of thin films. The bottom magnetic film 22, the lower layer insulator film 11, the gap film 25, the top magnetic film tip portion 12, the protective film 13, two conductor coil films 26, two upper insulator films 14, the top magnetic film rear portion 15 and the thick device protection film 28 are laminated on the upper face of the substrate 21 which is formed of the ceramic material of the slider or by disposing a base film on the surface of the ceramic material. The top magnetic pole piece is divided into the tip portion 12 and the rear portion 15 which are connected at a magnetic contact area through the contact hole 16 of the protective film 13, forming a magnetic circuit with the bottom magnetic film 22.

The film thickness of the rear portion 15 of the top magnetic film is 4 μm, and is greater than the film thickness 2 μm of the tip portion 12 so as to improve the contraction effect of the magnetic flux.

The front edge A of the rear portion 15 of the top magnetic film is positioned more rearward than the point B having the magnetic gap depth. This is to prevent leakage of magnetic flux, which occurs from the top magnetic film rear portion 15 when the gap depth is reduced as much as possible, from affecting the recording medium, and at the same time, to prevent the signal magnetic field from the recording medium from generating signal distortion through the top magnetic film rear portion 15.

The rear end D of the tip portion 12 of the top magnetic film projects more rearwardly than the rear end C of the contact hole 16. This is to reliably connect the tip portion 12 of the top magnetic film to its rear portion 15 through the contact hole 16. If this projection length (the distance between D and C in the horizontal direction) is too great, the leakage quantity of the magnetic flux with the bottom magnetic film 22 may increase and efficiency of the magnetic head drops in some cases.

On the other hand, the bottom magnetic film 22 has the structure wherein the film thickness increases from the intermediate position E to the rear portion in order to improve the contraction effect of the magnetic flux in the same way as in the top magnetic film. From the aspect of prevention of leakage of the magnetic flux from the top magnetic film to the bottom magnetic film, too, the film thickness is preferably increased.

The position E is in front of the position D so as to prevent saturation of the magnetic flux.

In FIG. 7(a), the lower insulator film 11 consists of one layer whereas each of the upper layer insulator film 14 and the conductor coil film 26 has a two-layered structure. Other structures may be used.

Figure 2B:
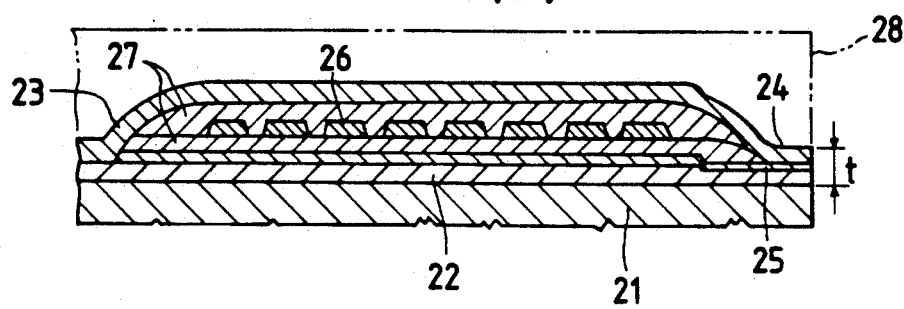

Unlike the thin film magnetic head of the prior art example shown in FIGS. 2(a)–2(b), the thin film magnetic head shown in FIG. 7(a) has the structure wherein the magnetic gap film 25 is disposed above the lower insulator film 11. This is effective for preventing the surface of the lower insulator film 11 from being damaged when the pattern of the top magnetic film tip portion 12 is formed by etching or when the etching mask is removed.

Figure 7B:
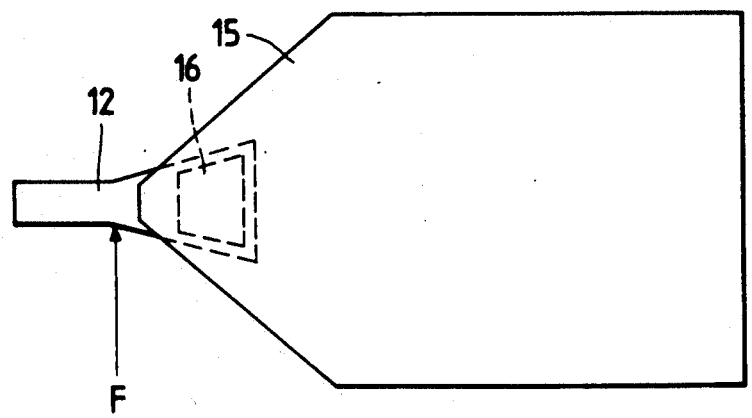

FIG. 7(b) is a top view of only the top magnetic pole piece of FIG. 7(a). In order to make the magnetic contact area as great as possible, the contact hole 16 is formed at a position rearwardly of the position F where the magnetic pole piece starts widening. To accommodate any positioning errors between the tip portion 12 and rear portion 15 of the top magnetic film during the production process, the widening angle of the tip portion 12 is made smaller than that of the rear portion 15. This also helps to prevent the etching step of the film 15 affecting the tip portion. This also avoids corrugations in the magnetic pole piece shape.

Reference should be made to FIGS. 14(a)–(e) which show a method of production of the head of FIGS. 7(a) and 7(b).

As can be seen in FIGS. 7(a) and 7(b), the protective layer 13 is formed after the deposition and shaping of the tip portion 12, and provides protection to the tip portion during subsequent processing, in particular during the etching of the film 15 both in its width direction and at its front edge A. The front edge of the film 15 overlies the layer 13. The film 13 has been etched through to provide an end surface (rather than a side surface) which defines the hole 16 at which the magnetic contact area of the two portions 12,15 of the top pole piece is made.

The area of the hole 16, which is the area of this magnetic contact, is chosen to be larger than the cross-sectional area, in a plane perpendicular to the surface of the substrate 21, of the tip portion 12, at any region between the hole 16 and the end surface of the tip portion which faces the track. This ensures good flux characteristics.

FIGS. 8(a)–8(b) show histogram representing the effect of the present invention. They compare the pole length distribution of the thin film magnetic head produced in FIG. 7(a) and 7(b) (FIG. 8(b)) with the pole length distribution of the thin film magnetic head produced by the prior art method (FIG. 8(a)) and represent the results produced with a pole length of 3.7 μm being the target value. When the prior art method is employed, the tip portion of the upper magnetic film is etched during the fabrication process of the magnetic head so that the pole length distribution is great. By contrast, when the present invention is applied, variance of the pole length depends only on variance of the film thickness of the magnetic film and gap film. It can therefore be understood that the pole length, can be controlled highly accurately.

When track width accuracy is compared between the prior art method and the present invention, it has been found that the present invention can achieve a track width accuracy higher by ±0.1–0.2 μm than the prior art method because the present invention employs the structure wherein the sidewall of the tip portion 12 of the top magnetic film is not etched in processing steps after its formation.

Accordingly, it has been found that when the present invention is applied, a thin film magnetic head having high dimensional accuracy and suitable for high density recording can be accomplished.

Figure 9A:
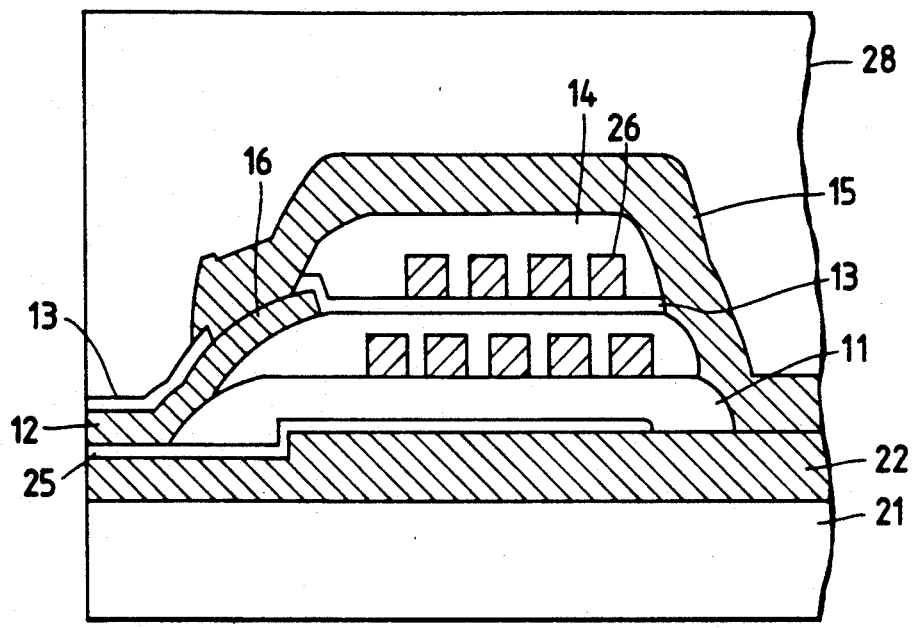

FIG. 9(a) is a sectional view showing principal portions of the structure of another thin film magnetic head of the present invention. Unlike FIG. 7(a), the lower insulator film 11 has a two-layer structure and the top magnetic film tip portion 12 is formed on it. The magnetic gap film 25 is formed between the bottom magnetic film 22 and the lower insulator film 11 in the same way as in the magnetic head of the prior art structure.

When the structure shown in FIG. 9(a) is applied, too, the primary object of the present invention, that is, a thin film magnetic head having the pole length and the track width controlled highly accurately, can be accomplished, too.

Since the top magnetic film rear portion 15 can be formed when the step is small according to this embodiment, the top magnetic film rear portion 15 can also be formed accurately.

Figure 9B:
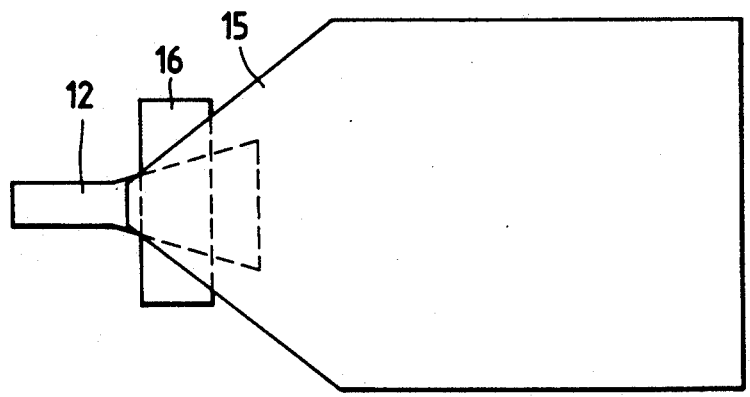

FIG. 9(b) is a top view of only the top magnetic pole piece of FIG. 9(a). To enlarge the magnetic connection area, the contact hole 16 is formed in such a manner as to extend out from the patterns of the tip portion 12 and rear portion 15. The rear portion is again wider than the tip portion, at the contact region.

Figure 10:
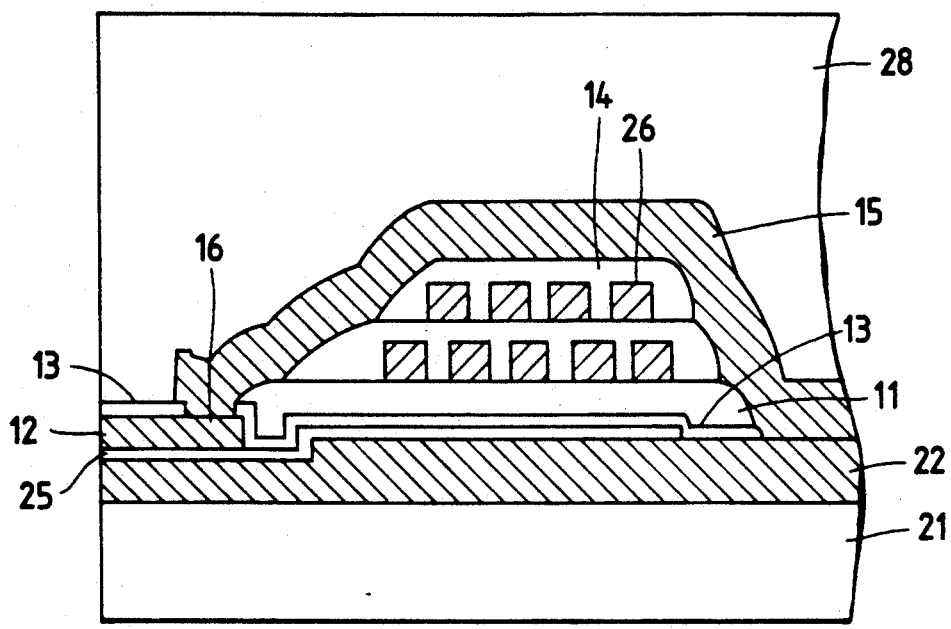

In FIG. 10, unlike in FIGS. 7(a) and 9(a), the upper magnetic film tip portion 12 is formed immediately above the bottom magnetic film 22 and the magnetic gap film 25 and there is no layer corresponding to the lower insulator film. An insulator film 11 is disposed immediately below the upper insulator films 14.

According to this embodiment, the tip portion of the top magnetic film can be formed at the flat portion on the gap film. Accordingly, the track width of the tip portion can be formed highly accurately.

Figure 11:
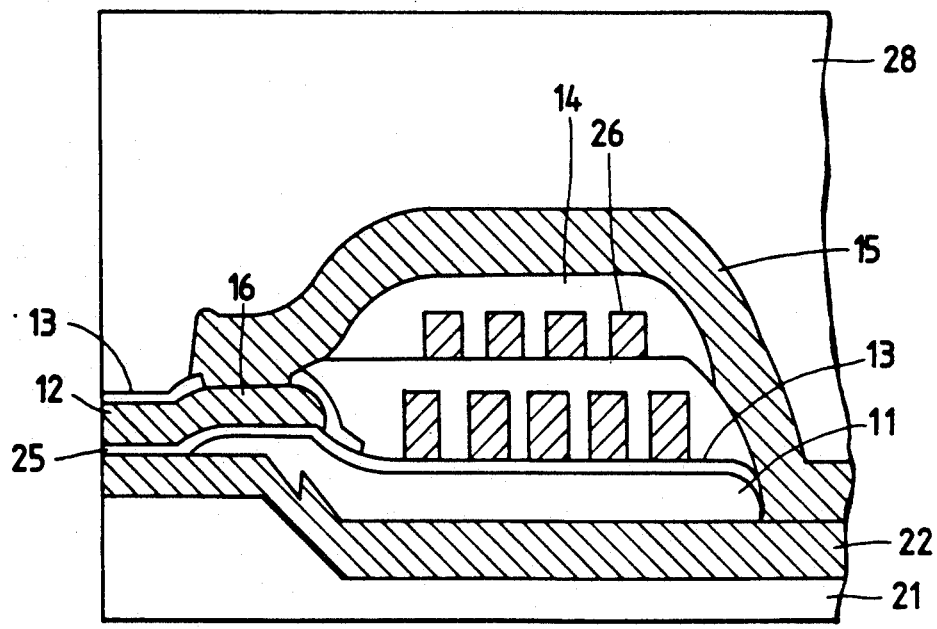

In the structure of FIG. 11, a step is formed on the substrate 21. The tip portion of the magnetic head is formed at the upper part of the step and its rear portion is formed at the lower part of the step. When the structure shown in FIG. 11 is employed, the height of the step when forming the tip portion 12 of the top magnetic pole piece can be reduced more greatly than in FIG. 7(a) so that track width accuracy can be further improved.

Since the height of the step when forming the conductor coil 26 can likewise be reduced, a conductor coil having a miniature size and a higher aspect ratio can be formed easily and a thin film magnetic head having good characteristics can be achieved.

Figure 12:
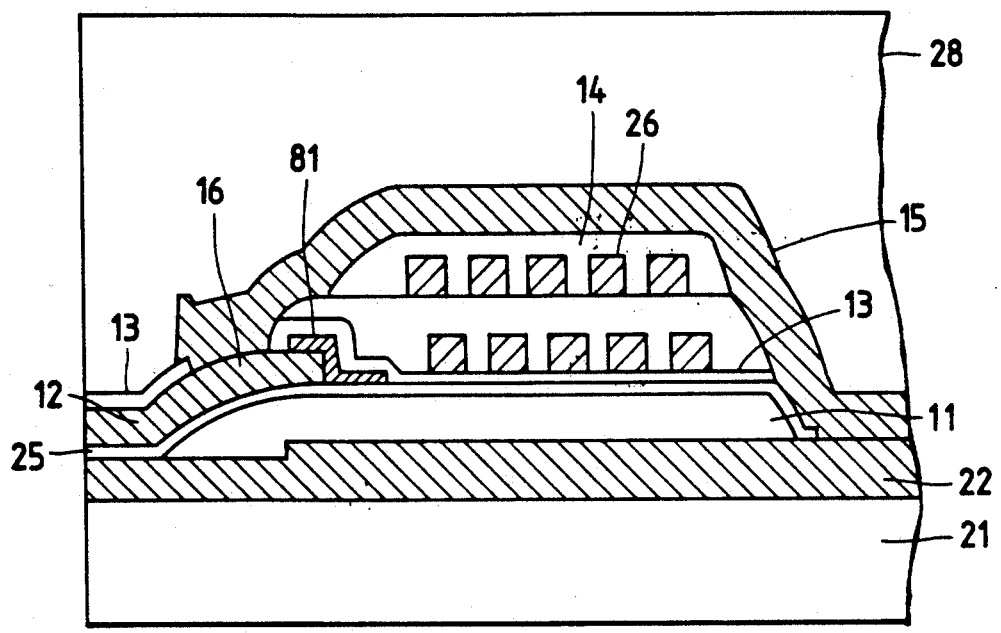

The overall structure in FIG. 12 is analogous to the structure shown in FIG. 7(a). However, a magnetoresistive film 81 is disposed at the rear end of the tip portion 12 of the top magnetic pole piece and, in conventional manner, a current can be caused to flow through this magneto-resistive film 81. In the thin film magnetic head shown in FIG. 12, the write operation of the signal is performed by the same operation as in the magnetic head shown in FIG. 7(a), but the signal read operation is performed by detecting of the change of the electric resistance value of the magneto-resistive film 81 as the signal. At this time the tip portion 12 operates as a flux guide to the magneto-resistive film 81. A thin film magnetic head having high sensitivity and suitable for high recording density can be accomplished by use of the read/write separation type magnetic head as shown in FIG. 12.

Figure 13:
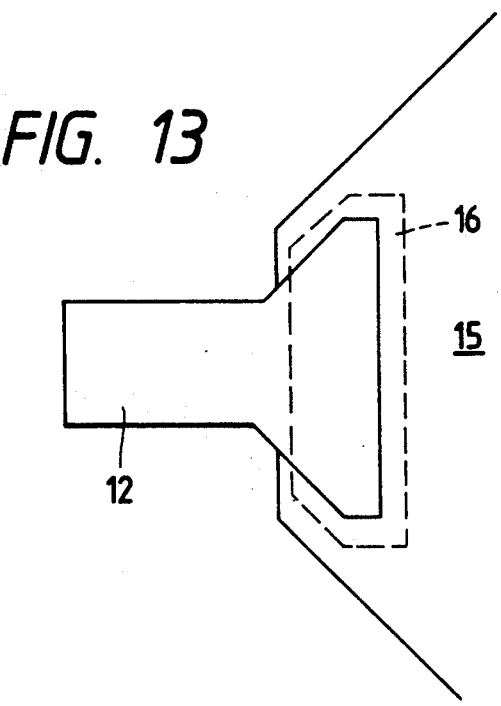

FIG. 13 is a top view of part of the top pole piece in another embodiment. To enlarge the magnetic film connection area as much as possible, the contact hole 16 is formed to be greater than the widest region of the tip portion 12. According to this arrangement, even when any positioning error occurs between the tip portion 12 and rear portion 15 of the top magnetic film during the production process, they can be connected magnetically in a highly accurately manner.

FIGS. 14(a)–(e) is a series of sectional views showing the production of the thin film magnetic head in another embodiment of the present invention.

Figure 14A:
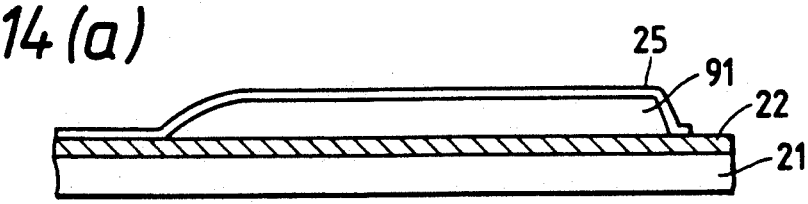
FIGS. 14(a)–14(e) and 15(a)–15(b) are sectional views showing the production method of the thin film magnetic head in accordance with embodiments of the present invention.

As shown in FIG. 14(a), the bottom magnetic film 22, the first insulator film 91 and the gap film 25 are formed on the substrate 21.

Figure 14B:
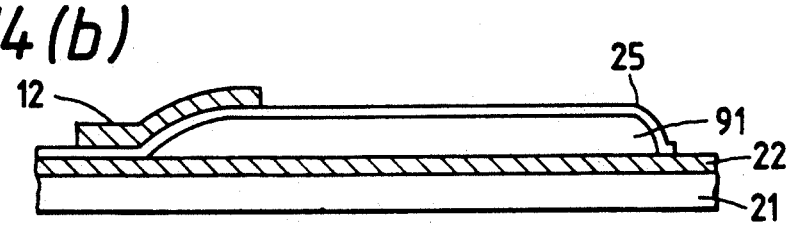

As shown in FIG. 14(b), a 2 μm-thick magnetic film is applied by sputtering and then the top pole piece tip portion 12 is formed by ion milling with high accuracy of width and thickness.

Figure 14C:
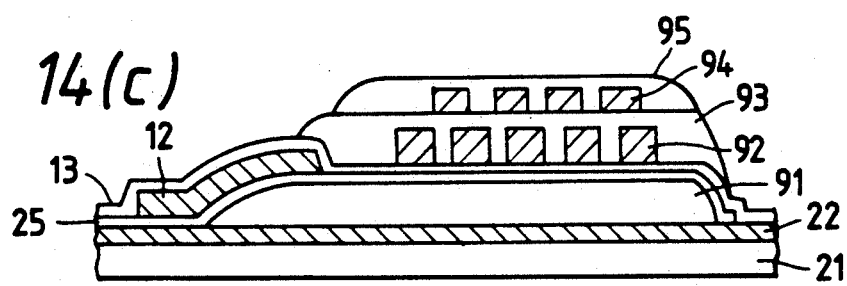

As shown in FIG. 14(c), a 1 μm-thick alumina film is sputtered to form the protective film 13 and then the first conductor coil film 92, the second insulator film 93, the second conductor coil film 94 and the third insulator film 95 are formed.

Figure 14D:
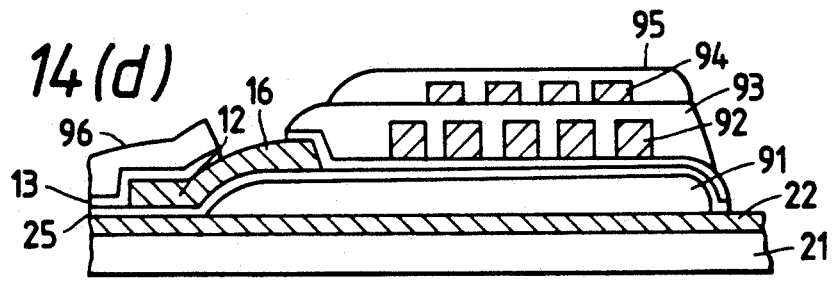

As shown in FIG. 14(d), a photoresist layer 96 is formed and the protective film 13 is etched using this photoresist layer 96 and the second insulator film 93 as the masking material so as to form the contact hole 16.

Figure 14E:
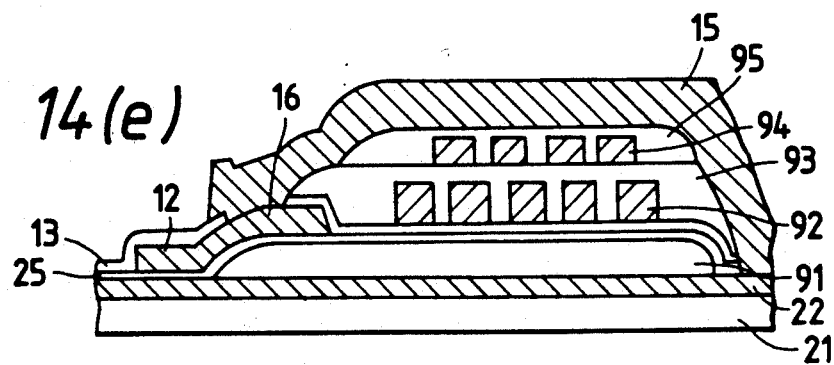

After the photoresist layer 96 is removed, a 4 μm-thick magnetic film is sputtered as shown in FIG. 14(e). Then, the top magnetic film rear portion 15 is formed by ion milling. At this stage the tip portion 12 is protected by the protective film 13.

Later the tip region of the magnetic head is shaped to produce the track-defining end surfaces of the pole pieces.

Though the description given above explains the case where the magnetic films are formed by sputtering, the thin film magnetic head having a similar structure can be obtained when the magnetic film is formed by plating, vacuum deposition, or the like.

As described with reference to FIG. 14(d), the position of the contact hole 16 can be determined accurately by self-alignment by using the second insulator film 93 as part of the mask for etching the contact hole 16.

Besides the structure shown in FIGS. 14(a)–14(e), the similar self-alignment effect can be obtained by using the third insulator film 95 as the masking material when the end portion of the third insulator film 95 is positioned ahead of the end portion of the second insulator film 93. If such self-alignment is employed, the end portion of the contact hole 16 is in agreement with the end portion of the third insulator film 95.

Figure 15A:
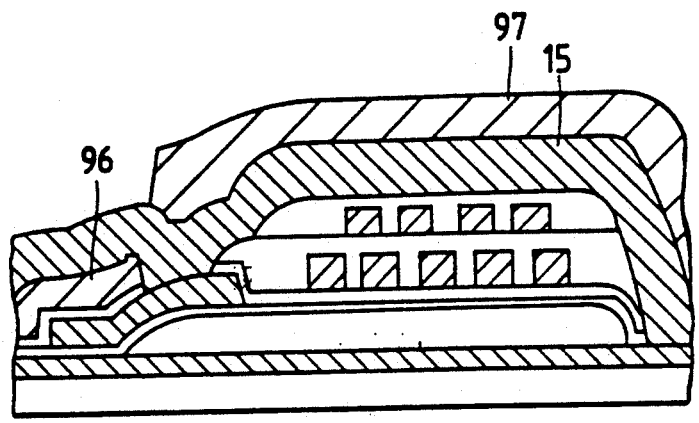
Figure 15B:
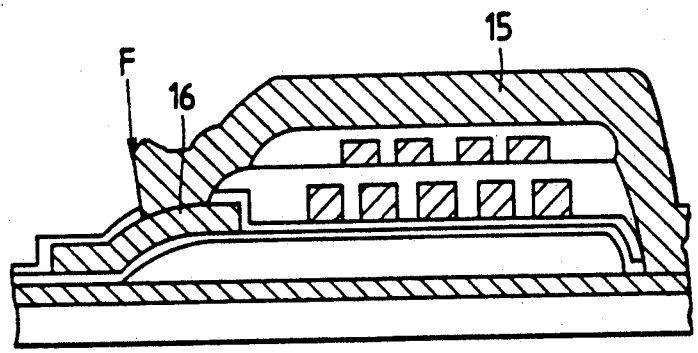

FIGS. 15(a)–15(b) are sectional views showing part of the production method of another thin film magnetic head of the present invention. The same production steps as those of FIGS. 14(a) to 14(d) are carried out. The 4 μm-thick magnetic film 15 for the rear portion of the top pole piece is formed while leaving the photoresist layer 96 in place and the photoresist layer 97 is formed thereon to obtain the structure shown in FIG. 15(a).

After the magnetic film 15 is etched, the photoresist layers 96 and 97 are removed to form the top magnetic film rear portion 15 as shown in FIG. 15(b). The edge F of the rear portion 15 of the top magnetic film and the edge of the contact hole 16 are determined by the same photoresist pattern layer 96. Accordingly, a highly accurate magnetic pole piece shape can be obtained and a thin film magnetic head having excellent characteristics can be achieved.

Figure 16:
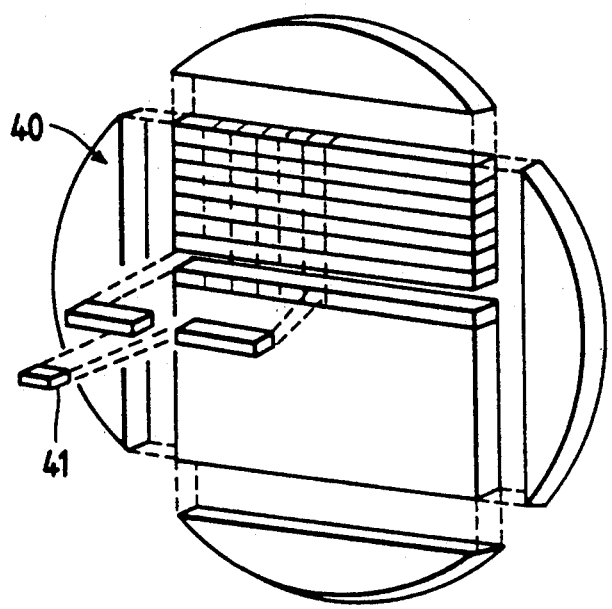
FIG. 16 is a diagram illustrating the formation of the thin film magnetic heads on a wafer.

FIG. 16 shows how the thin film magnetic heads are formed on a wafer. A plurality of thin film magnetic heads are formed simultaneously on a wafer 40 made of a non-magnetic ceramic or the like by applying the production steps of the thin film magnetic head as shown in FIGS. 14(a)–14(e). The portions of the wafer are then shaped to the slider type thin film magnetic head shown in FIG. 4. In this manner, a plurality of thin film magnetic heads 41 can be fabricated simultaneously and the individual thin film magnetic heads have high accuracy.

By the invention, a track width of the magnetic head of less than 10 μm or even less than 6 μm can be accurately achieved.

The present invention is not restricted to a hard disk magnetic storage apparatus but can be applied to a compact magnetic storage apparatus using a magnetic recording medium such as a video tape or a floppy disc.

What is claimed is:

1. A magnetic head for at least one of reading from and writing to a magnetic information storage medium, having a substrate on which a plurality of thin films are formed in sequence, said films providing a magnetic circuit having a magnetic gap, a bottom pole piece, and a top pole piece overlying said bottom pole piece, the top pole piece being formed from at least two of said films comprising a first film providing a tip portion of the top pole piece adjoining said magnetic gap and a second film providing a rear portion of the top pole piece which makes direct magnetic contact with the tip portion, said second film being formed in said sequence after said first film, and said films further including a non-magnetic protective film on said tip portion formed in said sequence after said first film and before said second film for preventing said tip portion from being damaged during formation of said rear portion.

2. A magnetic head for at least one of reading from and writing to a magnetic information storage medium, comprising a substrate carrying a plurality of thin films, said thin films providing
   (i) a bottom pole piece and a top pole piece having respective end surfaces separated by a magnetic gap and in use facing towards the magnetic medium, said top pole piece having a tip portion which provides said end surface thereof and a rear portion which makes direct magnetic contact with said tip portion at a magnetic contact area spaced from said end surface of the top pole piece, said tip portion and said rear portion being formed from different ones of said films, and said rear portion being above said tip portion at said magnetic contact area, and
   (ii) a non-magnetic protective film on the upper face of said tip portion and having an end surface which defines at least one edge region of said magnetic contact area which edge region is directed towards said end surface of the top pole piece.

3. A magnetic head according to claim 2 wherein said end surface of said non-magnetic protective film is at an etched edge thereof.

4. A magnetic head according to claim 2 wherein said rear portion of said top pole piece overlies part of said protective film adjacent said end surface of the protective layer.

5. A magnetic head according to claim 2 wherein said end surface of said protective film is at least part of a surface surrounding a hole in said protective film, said magnetic contact area being located in said hole.

6. A magnetic head according to claim 2 wherein at least one of said plurality of thin films provides electrical conductors lying between said bottom pole piece and said top pole piece and overlying said protective film.

7. A magnetic head according to claim 2, wherein said protective film is of inorganic material.

8. A magnetic head according to claim 2 wherein the thickness of said protective film is in the range 0.5 to 2 μm.

9. A magnetic head according to claim 2 wherein the thickness of said rear portion of said top pole piece is greater than that of said tip portion.

10. A magnetic head according to claim 2 wherein, as seen in plan view on said substrate, at the region of said magnetic contact area said rear portion of said top pole piece is wider than said tip portion in the direction parallel to said end surfaces of said pole pieces.

11. A magnetic head according to claim 2 having a magneto-resistive element and wherein said tip portion extends beyond said magnetic contact area in the direction away from aid end surface of said top pole piece so as to make magnetic contact with said magneto-resistive element.

12. A magnetic head according to claim 2 wherein the surface area of said magnetic contact area is greater than the smallest cross-sectional area of said tip portion between said magnetic contact area and said end surface of the top pole piece.

13. A magnetic head according to claim 2 wherein said tip portion, as seen in plan view on said substrate, is wider in the direction parallel to said end surfaces of said pole pieces at said magnetic contact area than at said end surface of said top pole piece.

14. A magnetic head according to claim 2 wherein said tip portion and said rear portion of said top pole piece are made of different materials.

15. A magnetic head according to claim 2 wherein the track width of said top pole piece is not more than 10 μm.

16. A magnetic head for at least one of reading from and writing to a magnetic information storage medium, comprising a substrate carrying a plurality of thin films, said thin films providing
   a bottom pole piece and a top pole piece having respective end surfaces separated by a magnetic gap and in use facing towards the magnetic medium, said top pole piece having a tip portion which provides said end surface thereof and a rear portion which makes direct magnetic contact with said tip portion at a magnetic contact area spaced from aid end surface of the top pole piece, said tip portion and said rear portion being formed from different ones of said films, and said rear portion being above said tip portion at said magnetic contact area,
   wherein, as seen in plan view on said substrate, at the region of said magnetic contact area, said rear portion is wider than said tip portion in the direction parallel to said end surfaces of said pole pieces.

17. A magnetic head for at least one of reading from and writing to a magnetic information storage medium, comprising a substrate carrying a plurality of thin films, said thin films providing
   (i) a bottom pole piece and a top pole piece having respective end surfaces separated by a magnetic gap and in use facing towards the magnetic medium, said top pole piece having a tip portion which provides said end surface thereof and a rear portion which makes direct magnetic contact with said tip portion at a magnetic contact area spaced from said end surface of the top pole piece, said tip portion and said rear portion being formed from different ones of said films, and said rear portion being above said tip portion at said magnetic contact area and being formed after said tip portion, said tip portion being covered with a non-magnetic protective film for preventing said tip portion from being damaged during formation of said rear portion, and
   (ii) a magneto-resistive element located further from said end surfaces of said pole pieces than said magnetic contact area,
   said tip portion extending from said magnetic contact area so as to make magnetic contact with said magneto-resistive element.

18. A magnetic head for at least one of reading from and writing to a magnetic information storage medium, comprising a substrate carrying a plurality of thin films, said thin films providing
   a bottom pole piece and a top pole piece having respective end surfaces separated by a magnetic gap and in use facing towards the magnetic medium,
   said top pole piece having a tip portion which provides said end surface thereof and a rear portion which makes direct magnetic contact with said tip portion at a magnetic contact area spaced from said end surface of the top pole piece, said tip portion and said rear portion being formed from different ones of said films, said rear portion being above said tip portion at said magnetic contact area and being formed after said tip portion, said tip portion being covered with a non-magnetic protective film for preventing said tip portion from being damaged during formation of said rear portion,
   wherein the surface area of said magnetic contact area is greater than the smallest cross-sectional area in the direction perpendicular to said substrate of said tip portion between said magnetic contact area and said end surface of said top pole piece.

19. A magnetic head for at least one of reading from and writing to a magnetic information storage medium, comprising a substrate carrying a plurality of thin films, said thin films providing
   (i) a bottom pole piece and a top pole piece having respective end surfaces separated by a magnetic gap and in use facing towards the magnetic medium, said top pole piece having a tip portion which provides said end surface thereof and a rear portion which makes direct magnetic contact with said tip portion at a magnetic contact area spaced from said end surface of the top pole piece, said tip portion and said rear portion being formed from different ones of said films, and said rear portion being above said tip portion at said magnetic contact area,
   (ii) a non-magnetic protective layer which overlies at least part of said tip portion and has a hole which at least partly defines said magnetic contact area.

20. A head disc assembly for a magnetic information storage apparatus, including a magnetic head having a substrate on which a plurality of thin films are formed in sequence, said films providing a magnetic circuit having a magnetic gap, a bottom pole piece and a top pole piece overlying said bottom pole piece, the top pole piece being formed from at least two of said films comprising a first film providing a tip portion of the top pole piece adjoining said magnetic gap and a second film providing a rear portion of the top pole piece which makes direct magnetic contact with the tip portion, said second film being formed in said sequence after said first film, and said films further including a non-magnetic protective film on said tip portion informed in said sequence after said first film and before said second film.

21. A head disc assembly for a magnetic information storage apparatus, including a magnetic head comprising a substrate carrying a plurality of thin films, said thin films providing
   (i) a bottom pole piece and a top pole piece having respective end surfaces separated by a magnetic gap and in use facing towards the magnetic medium, said top pole piece having a tip portion which provides said end surface thereof and a rear portion which makes direct magnetic contact with said tip portion at a magnetic contact area spaced from said end surface of the top pole piece, said tip portion and said rear portion being formed from different ones of said films, and said rear portion being above said tip portion at said magnetic contact area, and
   (ii) a non-magnetic protective film on the upper face of said tip portion and having an end surface which defines at least one edge region of said magnetic contact area which edge region is directed towards said end surface of the top pole piece.

22. A magnetic head for at least one of reading from and writing to a magnetic information storage medium, having a substrate on which a step is formed and a plurality of thin films are formed in sequence, said films providing a magnetic circuit having a magnetic gap, a bottom pole piece, and a top pole piece overlying said bottom pole piece, wherein a tip portion of the bottom pole piece is formed on the upper part of the step and other portion of the bottom pole piece is formed on the lower part of the step, the top pole piece being formed from at least two of said films comprising a first film providing a tip portion of the top pole piece adjoining said magnetic gap and a second film providing a rear portion of the top pole piece which makes direct magnetic contact with the tip portion, said second film being formed in said sequence after said first film, and said films further including a non-magnetic protective film on said tip portion formed in said sequence after said first film and before said second film.

* * * * *